(12) United States Patent
Mayse

(10) Patent No.: US 6,782,632 B2
(45) Date of Patent: Aug. 31, 2004

(54) WRITING INSTRUMENT-CALIPER SYSTEM AND METHOD

(76) Inventor: Martin L. Mayse, 920 Poeyfarre St., Apt. 133, New Orleans, LA (US) 70130

( * ) Notice: Subject to any disclaimer, the term of this patent is extended or adjusted under 35 U.S.C. 154(b) by 0 days.

(21) Appl. No.: 10/374,895

(22) Filed: Feb. 25, 2003

(65) Prior Publication Data

US 2003/0177654 A1 Sep. 25, 2003

Related U.S. Application Data

(60) Provisional application No. 60/362,262, filed on Mar. 7, 2002.

(51) Int. Cl.[7] .............................. G01B 3/16; B43K 29/08
(52) U.S. Cl. ...................... 33/558.01; D10/73; D19/36; 401/195
(58) Field of Search .................. 33/558.01–558.09, 33/558.1, 558.2, 558.3; 401/52, 195; D10/73; D19/36, 45, 54

(56) References Cited

U.S. PATENT DOCUMENTS

| | | | | |
|---|---|---|---|---|
| 95,964 A | * | 10/1869 | Zerbe ...................... 33/558.01 |
| 235,726 A | * | 12/1880 | Benson ....................... 401/195 |
| 238,023 A | * | 2/1881 | Bramberg .................... 401/195 |
| 318,346 A | * | 5/1885 | Bramberg ..................... 401/52 |
| 1,785,187 A | * | 12/1930 | De La Torre ................. 401/52 |
| D137,339 S | * | 2/1944 | Liukko ........................ D19/36 |
| D155,561 S | * | 10/1949 | Weiss .......................... D19/36 |
| 2,497,826 A | * | 2/1950 | Sullivan ...................... 401/195 |
| 4,403,418 A | * | 9/1983 | Vagias ........................ 401/195 |
| D284,290 S | * | 6/1986 | Concilio et al. ............. D19/36 |
| D310,308 S | * | 9/1990 | Wolsey ....................... 401/195 |
| 5,115,571 A | * | 5/1992 | Mackin .................... 33/558.04 |
| D329,252 S | * | 9/1992 | Mackin ....................... D19/36 |
| 5,215,097 A | * | 6/1993 | Watabe ....................... 401/195 |
| D420,702 S | * | 2/2000 | Chang ......................... D19/36 |
| 6,471,432 B1 | * | 10/2002 | Kremer ....................... 401/195 |
| D470,780 S | * | 2/2003 | Hsieh ......................... D10/73 |
| 2002/0123859 A1 | * | 9/2002 | Mewissen et al. .......... 702/161 |

* cited by examiner

Primary Examiner—G. Bradley Bennett

(57) ABSTRACT

Described is a writing instrument-caliper system composed of a fully functional writing instrument and a separate caliper device. The writing instrument and caliper device are of such construction that the caliper device can be inserted snugly into the open-ended hollow barrel of the writing instrument for safe storage. With the caliper device in its storage location, the writing instrument-caliper system is of similar outer physical dimensions to the writing instrument alone, and can be carried safely in a shirt pocket without risk of injury to the user or it can be employed as a fully functional writing instrument. With the caliper device removed from its storage location, the writing instrument and caliper device can be employed in parallel, allowing the user to make written notations while simultaneously making measurements with the caliper device. This writing instrument-caliper system overcomes many of the problems encountered by prior art devices.

11 Claims, 12 Drawing Sheets

WRITING INSTRUMENT-CALIPER SYSTEM AND METHOD

CROSS-REFERENCE TO RELATED APPLICATIONS

This application seeks the benefit of provisional application No. 60/362,262 filed Mar. 7, 2002

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISC APPENDIX

Not applicable.

BACKGROUND OF THE INVENTION

The invention relates to a writing instrument-caliper system that is especially useful to a physician (or other person) who must write large amounts of information as well as make frequent precise measurements.

A physician frequently carries both a writing instrument and sheathed calipers in his/her pocket. The sheath is in place so as to protect the physician from the sharp end points of the caliper legs. When the physician wishes to measure intervals or distances on an electrocardiogram (ECG), he/she removes the calipers from his/her pocket and un-sheaths them. The sharp end points of the calipers are deployed to measure distances or intervals on the ECG. The sharp end points are then used to compare the measured distance or interval to other similar distances or intervals. Alternatively, the sharp end points can be held against a numerical scale to obtain a numerical measurement of the distance or interval. The physician then removes a writing instrument from his/her pocket and deploys it to record these measurements in the patient's medical record. Frequently, the sheath for the dividers is misplaced and lost. This prevents the physician from returning the dividers to the pocket of his/her clothing because of the risk of the sharp end points piercing the physician's skin. It would be useful to a physician (or other person who makes frequent measurements from a chart or graph) to have a single device or a system that could be deployed both as a caliper and as a writing instrument.

U.S. Pat. No. 1,564,908 discloses calipers with a bracket for holding a writing instrument the tip of which is adjacent to one of the sharp points of the calipers.

U.S. Pat. No. 4,720,921 discloses calipers used as a navigational instrument, with a channel in the structure for frictionally receiving a writing instrument that can be gripped, removed from the channel, inverted, and reinserted with its writing tip protectively inside the channel. The disclosed navigational device includes various indicia that enable it to function as a protractor and as a distance-measuring device. Although the navigational instrument incorporates a writing instrument and calipers, it would not be suitable for use by physicians, because the divider tips are unprotected by a sheath when not in use, and the writing tip cannot be protected except by removing the writing instrument, inverting it, and reinserting it in the receiving channel, which would be more inconvenient than the present practice of using a separate sheathed caliper and a conventional writing instrument.

U.S. Pat. No. 4,815,881 discloses a multi-purpose combination writing instrument which can serve as a straight edge, a compass and a writing instrument. This device can be deployed as a writing instrument for general drawing or notation, or after some modification it can be deployed as a compass to draw arcs or circles, or it can be disassemble to be used as a straight edge and writing instrument to draw straight lines. This device is composed of a compass in which each leg takes the form of a half-hexagon in cross section. When the half-hexagonal compass legs are brought together and the compass is fully closed, the legs combine to form a hollow tube, which is hexagonal in cross section. A writing instrument can be movably placed between the legs of the compass and a protective cap can be placed over the tip of the writing instrument. The single sharp end point must be removed from the compass legs in order for the writing instrument to be placed between the half-hexagonal compass legs. The sharp end point can be placed in the cap for storage.

U.S. Pat. No. 5,115,571 discloses a reversible pen-caliper device and method for use by cardiologists that can be used as a caliper to measure distances on a chart or ECG, can then be reversed and utilized as a pen to make notations regarding these measurements, and then can be safely carried in a shirt pocket without poking through the clothing and skin of the user. Specifically, this device includes a retractable ballpoint pen assembly, an oppositely disposed caliper assembly, and a snug-fitting rigid sheath that is slidable over either the caliper assembly or the pen assembly. This arrangement allows the user to place the sheath over the pen assembly for safe keeping while using the calipers. This arrangement also allows the user to place the sheath over the caliper assembly so the pen-caliper can be safely carried on the body. While this arrangement allows for a compact device that is capable of functioning both as a pen and a caliper, the functionality of both the pen and caliper are compromised by this design. When using the device as a caliper, the device is gripped at some point along the barrel of the pen, either with or without the caliper's protective sheath in place. The pen barrel is fixedly attached to the caliper, and adds excessive weight and length to the gripping area of the device when used as a caliper. This weight and length reduces the fine control of the device when it is deployed as a caliper, thus limiting the user's ability to make accurate measurements on an ECG. The current device has attempted to overcome the heavy weight of the caliper, which was outlined above, by decreasing the diameter of the pen barrel. While this does increase the devices functionality as a caliper by a small margin, it greatly decreases the devices functionality as a pen. The resultant small size of the pen grip makes the device when used as a pen unsuitable for sustained writing, as the users hand will quickly fatigue. Additionally, the small size of the pen barrel limits the size of the pen refill, which makes this device suitable only for making short notations. However, because a physician will write reams of information in the medical record over the course of a normal day he/she will out of necessity need to carry a separate instrument that is more suited to sustained writing. Additionally, this device can only be employed serially as a caliper or a pen—it cannot be used as a caliper and a writing instrument in parallel. If the user wishes to make a notation while simultaneously employing the caliper to make a measurement from a graph, he/she must use a second writing instrument to make this notation. The device disclosed in U.S. Pat. No. 5,115,571 would not eliminate the need for the physician to carry a second writing instrument in addition to this pen-caliper device.

None of the foregoing devices satisfactorily fill the needs of a physician who must carry both a writing instrument and calipers. It would be desirable for a physician and others to have a single instrument which can be used as calipers for measuring distances on ECGs or the like and can be used as comfortable writing instrument.

BRIEF DESCRIPTIONS OF THE INVENTION

It is the object of the disclosed invention to provide a writing instrument-caliper system that can be utilized as a writing instrument, can also be used as a caliper to measure and compare distances on a chart or ECG, and can be safely carried in a shirt pocket without risk of the caliper points poking through the clothing and skin of the user.

Briefly described, and in accordance with one embodiment thereof, the invention provides a pen-caliper system which includes a pen device and a caliper device integrated into a single unit. The pen device is constructed such that the pen barrel is hollow and of sufficient size so as to snugly receive the caliper device. The arms and sharp end-points of the caliper therefore rest within the confines of the pen barrel for safekeeping. The system can be deployed as a writing instrument while the caliper is either in or out of its storage position in the hollow barrel of the pen device. To deploy the caliper, the caliper device is removed from the pen barrel and employed as an independent instrument, hence ensuring the functionality of the caliper by maintaining a relatively small size and low weight which is not encumbered by being fixedly attached to the pen device. This writing instrument-caliper system can be employed as a caliper and a writing instrument in parallel, thus allowing the user to make notations while simultaneously deploying the system's caliper.

The pen device having a pen barrel, a ballpoint ink cartridge in the barrel, and a mechanism engaging the ink cartridge and the barrel to advance the ink cartridge when the pen barrel is rotated so as to position a ballpoint tip of the ink cartridge for writing. The mechanism also effectuates retracting of the ballpoint tip into the pen barrel when the pen barrel is rotated in the opposite direction. The barrel of the pen opposite to the pen nib is hollow and capable of receiving the caliper device.

The caliper device has first and second caliper arms each having a pointed tip, and first and second gear elements attached to pivot ends of the first and second caliper arms, respectively. The first and second gear elements engage each other to cause symmetrical opening and closing of the first and second caliper arms. A pivot support is used to support first and second pivot elements, which pivotally connect the pivot ends of the first and second caliper arms to the pivot support. The caliper device can be inserted snuggly into the end of the pen device barrel such that the barrel serves as a rigid protective sheath for the caliper.

A user can remove the caliper device from the pen barrel to expose the first and second caliper arms. The user later can place the caliper device into the pen device barrel and retract the ballpoint tip so the pen-caliper system can be safely carried in a pocket of a user's clothing or the like.

DETAILED DESCRIPTION OF THE INVENTION

Figure 1:
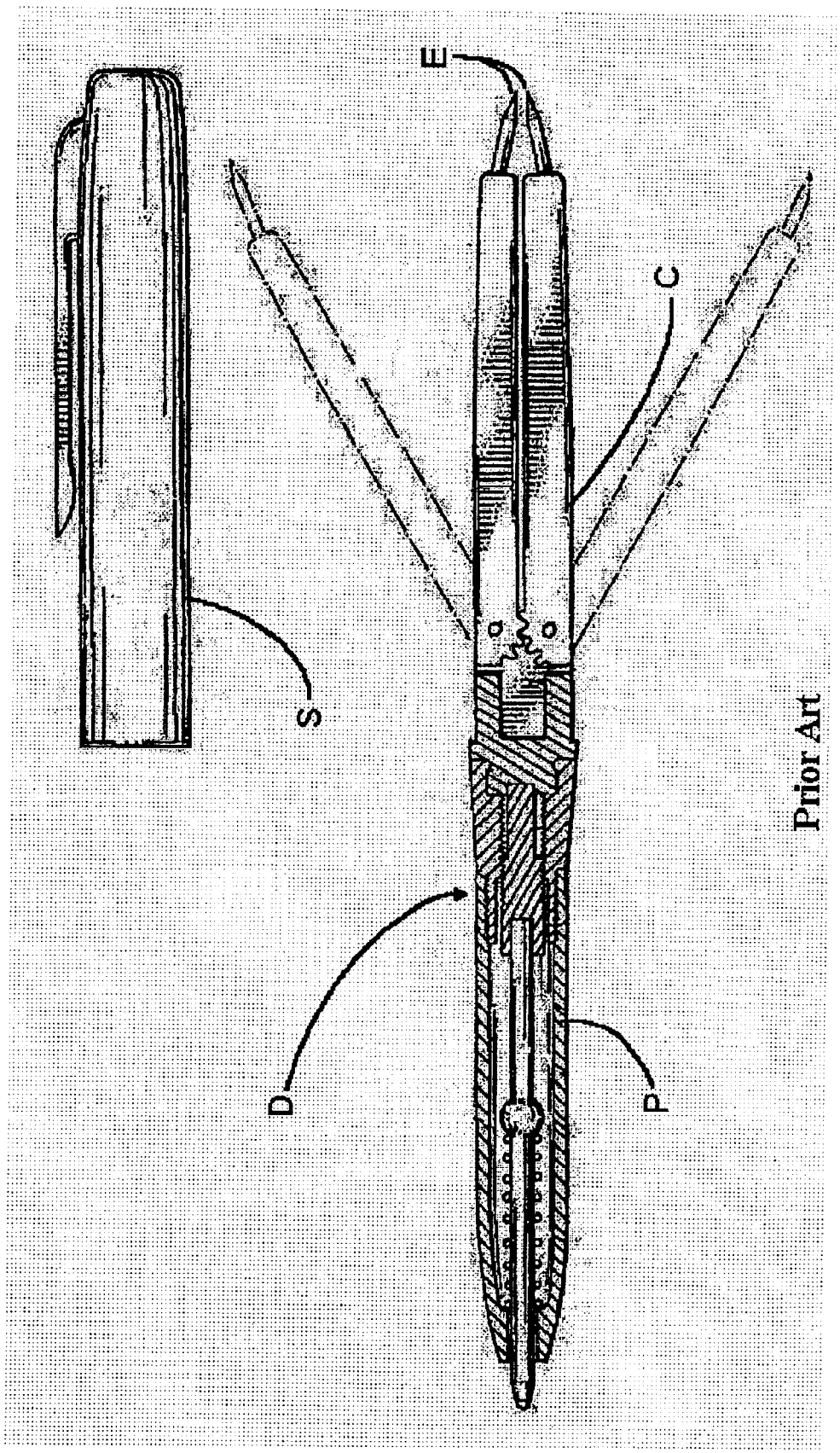
FIG. 1 is a partial cutaway diagram illustrating the prior art as disclosed in U.S. Pat. No. 5,115,571.

FIG. 1 demonstrates the prior art in which a pen-caliper device D includes a ballpoint pen assembly P fixably attached to an oppositely directed caliper assembly C. A protective sheath S is also provided which can be snuggly fit over the caliper assembly C to protect the user from the sharp endpoints E of the caliper, or over the pen assembly P for safe keeping while the caliper C is deployed.

Figure 2:
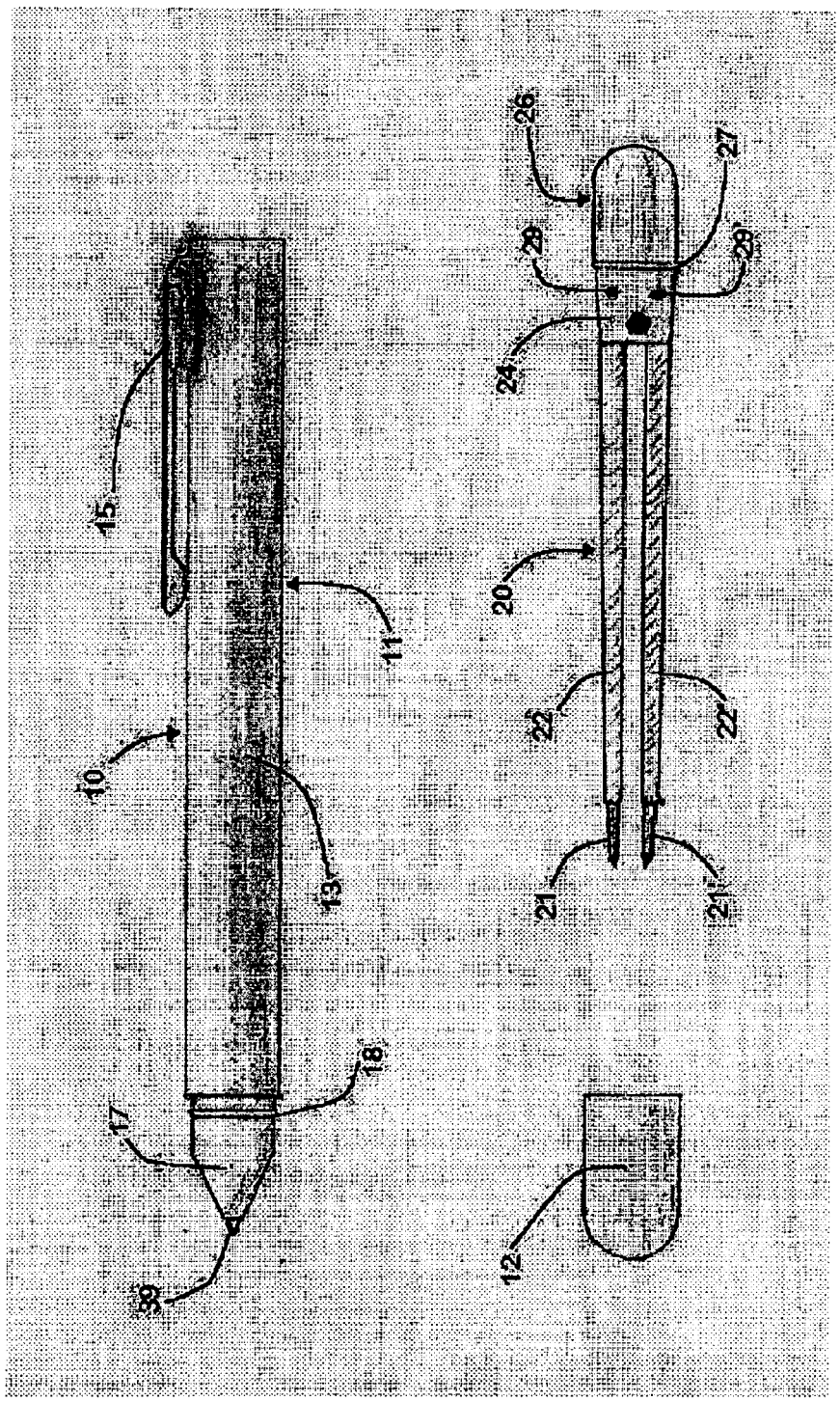
FIG. 2 is a diagram of the pen-caliper system of the invention with the caliper device removed from its storage space.

FIG. 2 demonstrates the pen-caliper system 10 of the current invention composed of the fixed nib pen device 11, the pen cap 12, and the caliper device 20. With the pen cap 12 removed from the pen tip 17 as shown, the pen nib 39 is exposed. The pen tip 17 has a circumferential elevation 18 on its outer surface which is mated to a circumferential depression 14 (FIG. 7) on the interior surface of the pen cap 12 allowing the pen cap 12 to snap firmly into place over the pen tip 17. The pen barrel 13 is hollow and of such internal design so as the snuggly receive the caliper device 20 for safekeeping and storage. With the caliper device 20 removed from its storage location in the hollow barrel 13 of the fixed nib pen device 11, the caliper arms 22 and 22' and their respective sharp endpoints 21 and 21' are exposed.

Figure 3:
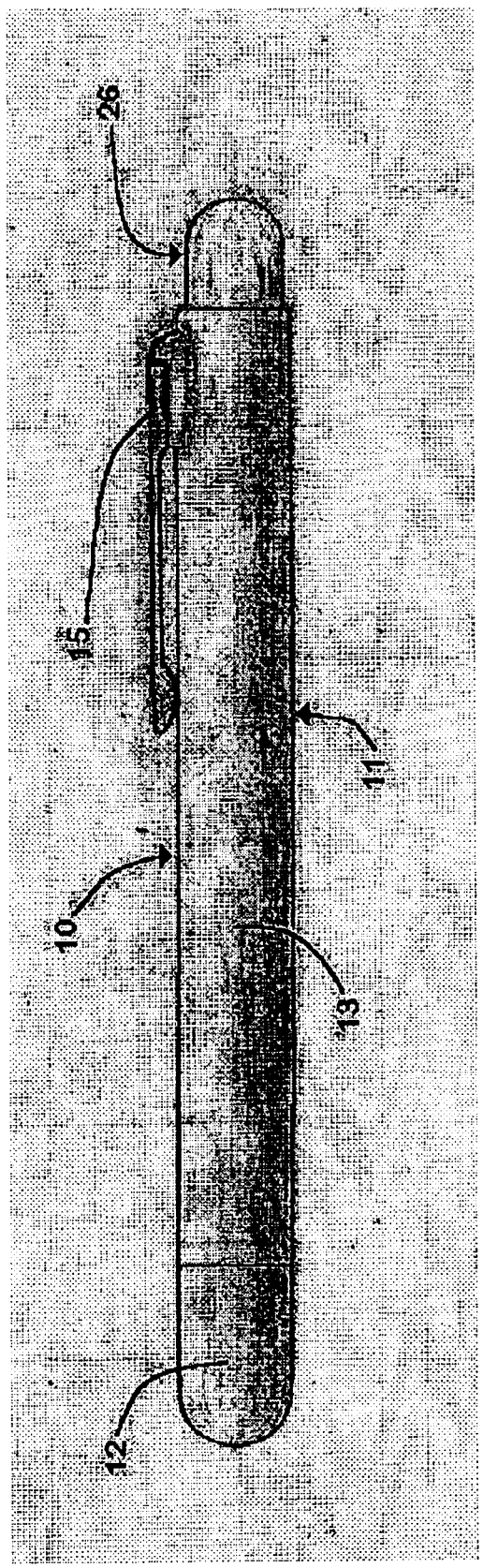
FIG. 3 is a side view diagram of the pen-caliper system of the invention with the caliper device located in its storage space and the pen cap in place over the pen tip.
Figure 4:
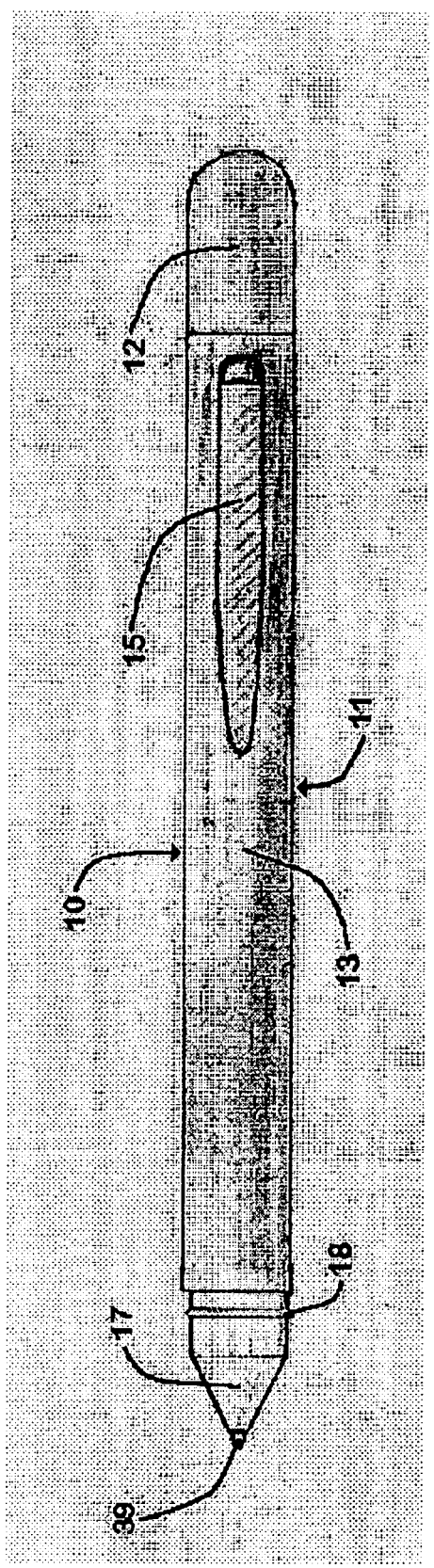
FIG. 4 is a top view diagram of the pen-caliper system of the invention with the caliper device located in its storage space and the pen cap in place over the support element of the caliper device.

FIG. 3 demonstrates a side view of the pen-caliper system 10 in its closed configuration. The pen cap 12 is in place over the now concealed pen tip 17. The caliper device 20 is in its storage position within the hollow pen barrel 13 such that only part of the support element 26 of the caliper device 20 is visible. A pocket clip 15 is attached to the right end portion of the hollow barrel 13. In this closed configuration the pen-caliper system 10 may be safely carried in a shirt pocket. FIG. 4 demonstrates a top view of the pen-caliper system 10 in its writing configuration. The pen cap 12 removed from the pen tip 17 and placed snuggly over the exposed portion of the support element 26 of the caliper device 20 concealing the support element 26 from view. In the configuration shown in FIG. 3, the pen-caliper system 10 may be used effectively as a writing instrument.

Figure 5:
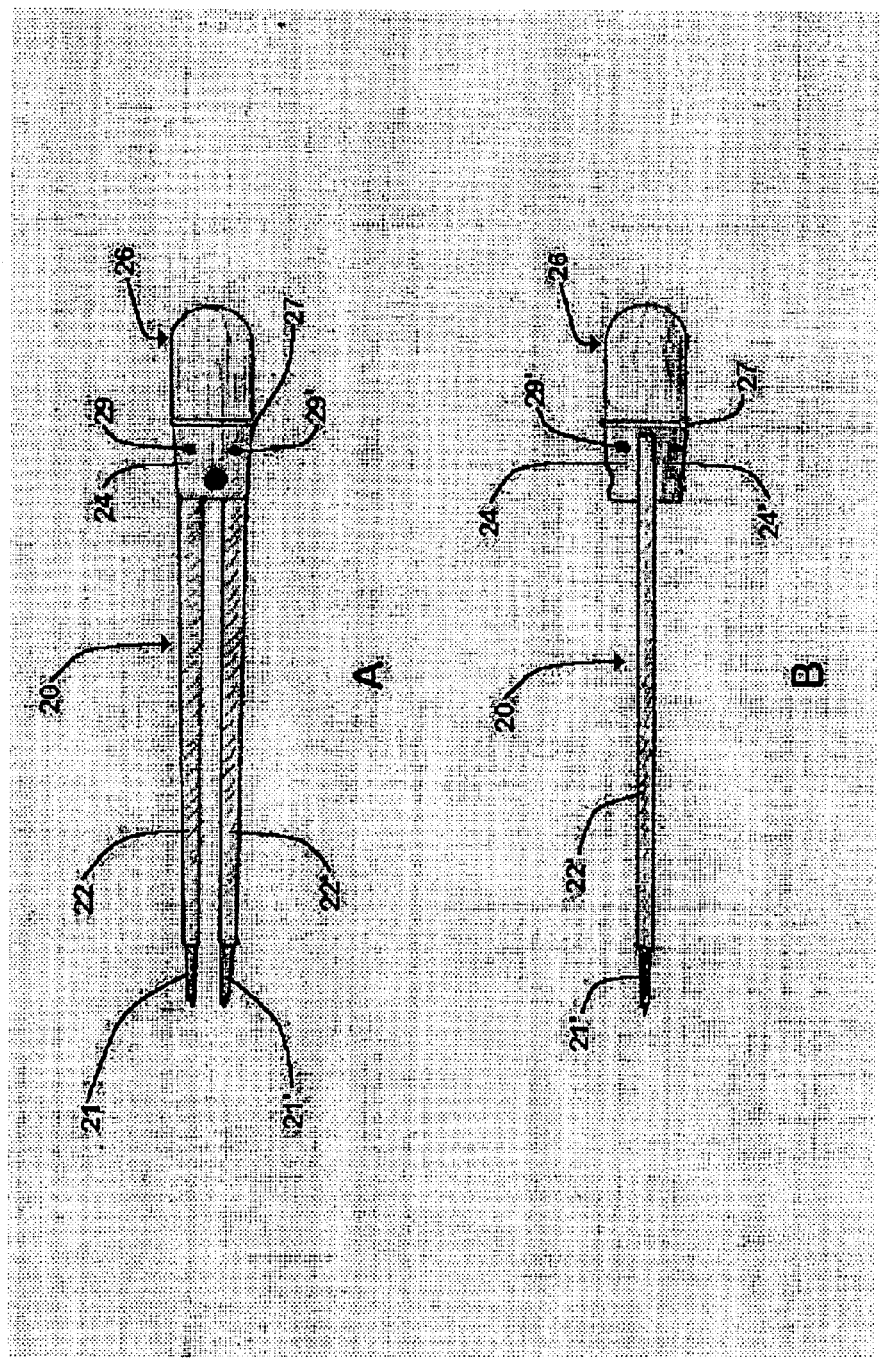
FIG. 5 is a top view diagram and a side view diagram of the caliper device.
Figure 6:
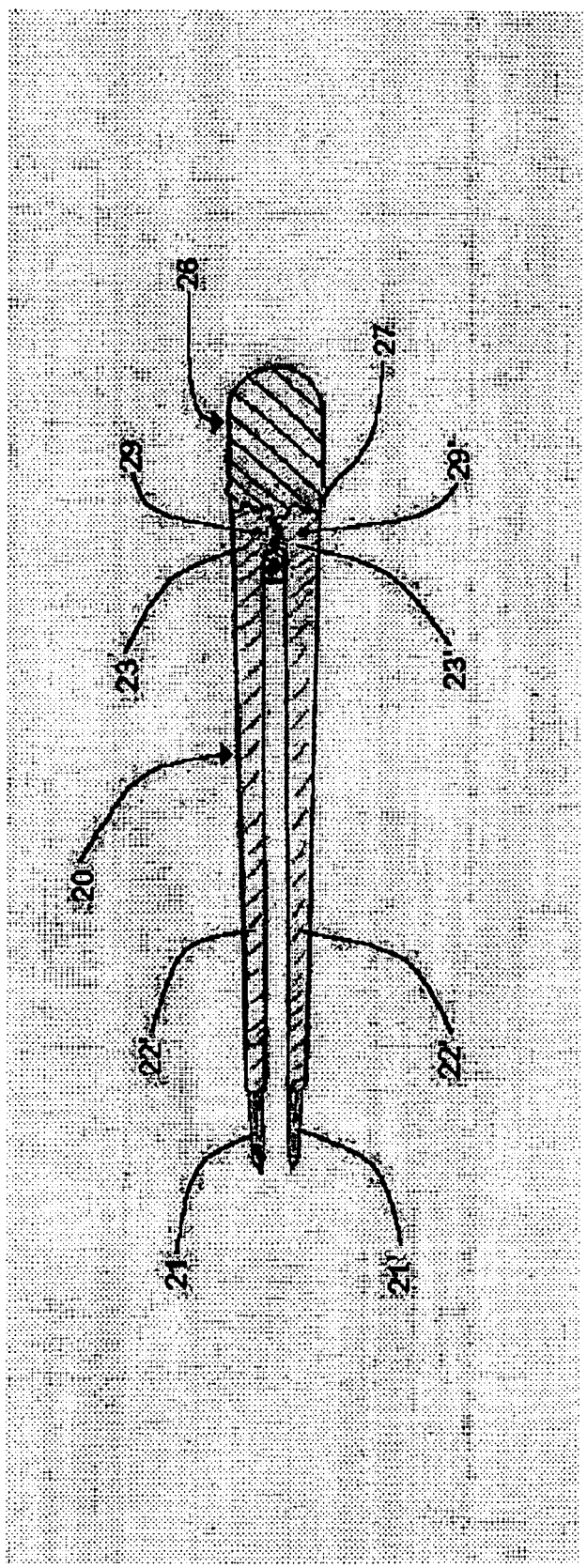
FIG. 6 is a partial cutaway of the caliper device demonstration the gear mechanism of the caliper arms.

Referring to FIGS. 2 and 5, the caliper device 20 is shown removed from its storage position in the hollow pen barrel 13 of the fixed nib pen device 11. The caliper device 20 is composed of a support element 26 with bifurcations 24 and 24', which support the gear sections 23 and 23' of caliper arms 22 and 22'. Caliper arm 22 and gear section 23 rotate about a pivot pin 29 that extends through the bifurcations 24 and 24' of the support element 26. Similarly, caliper arm 22' and gear section 23' rotate about a pivot pin 29' that extends through the bifurcations 24 and 24' of the support element 26. The teeth of gear section 23 mesh with the teeth of gear section 23' so that when either of caliper arms 22 or 22' is pivoted, the other arm symmetrically pivots an equal amount in the opposite direction by virtue of the gearing. The distal ends of caliper arms 22 and 22' each have a sharp endpoint 21 and 21' attached thereto.

As shown in FIG. 2, the caliper device 20 can be removed to from the hollow barrel 13 of the fixed nib pen device 11. The fixed nib pen device 11 can be left in the user's pocket while the caliper device 20 is deployed. When the caliper measurement has been made, caliper arms 22 and 22' are pivoted closed, and the caliper device 20 is replaced in its storage position in the hollow barrel 13 of the fixed nib pen device 11.

Figure 7:
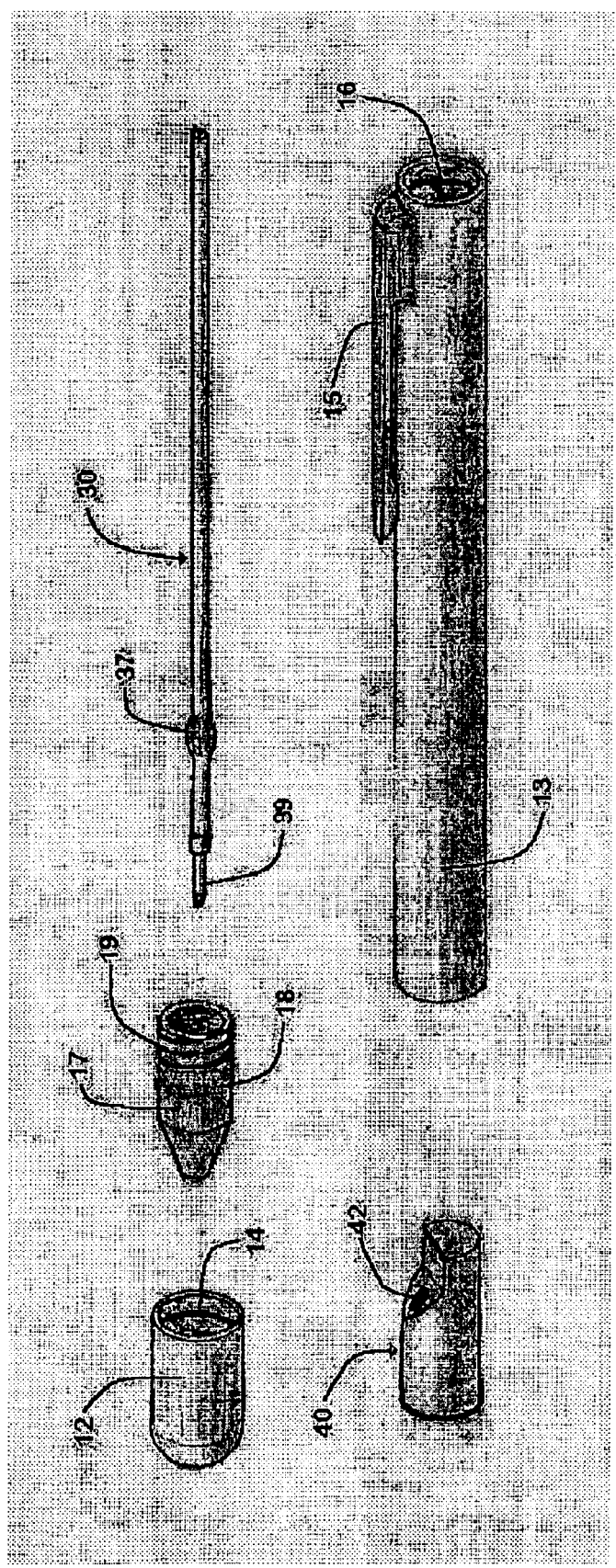
FIG. 7 is an exploded view of the pen device.

FIG. 7 is an exploded view of the fixed nib pen device 11. Demonstrated are the pen cap 12, the pen tip 17, the flexible pen refill 30, the pen refill grip 40, and the hollow pen barrel 13. The interior surface of the pen cap 12 demonstrates the circumferential depression 14 which mates with the circumferential elevation 18 on the outer surface of the pen tip 17 allowing the pen cap 12 to snap firmly into place over the pen tip 17.

A serpentine tunnel 42 passes through the body of the pen refill grip 40, entering in the center of the pen refill grip 42 at fore portion (not shown) and exiting off center at the aft portion. The flexible pen refill 30 is inserted into the serpentine tunnel 42 and enters the center of the fore portion of the serpentine tunnel 42 and exits off center in the aft portion of the serpentine tunnel 42. This causes the shaft of the pen refill 30 to be off the center axis of the hollow barrel 13 of the fixed nib pen device 11 so as not to interfere with the caliper arms 22 and 22' when the caliper is placed in its storage position within the hollow barrel 13.

The pen tip 17 is attached by external threads 18 to matching internal threads (not shown) in the fore portion of the pen barrel 13.

Figure 8:
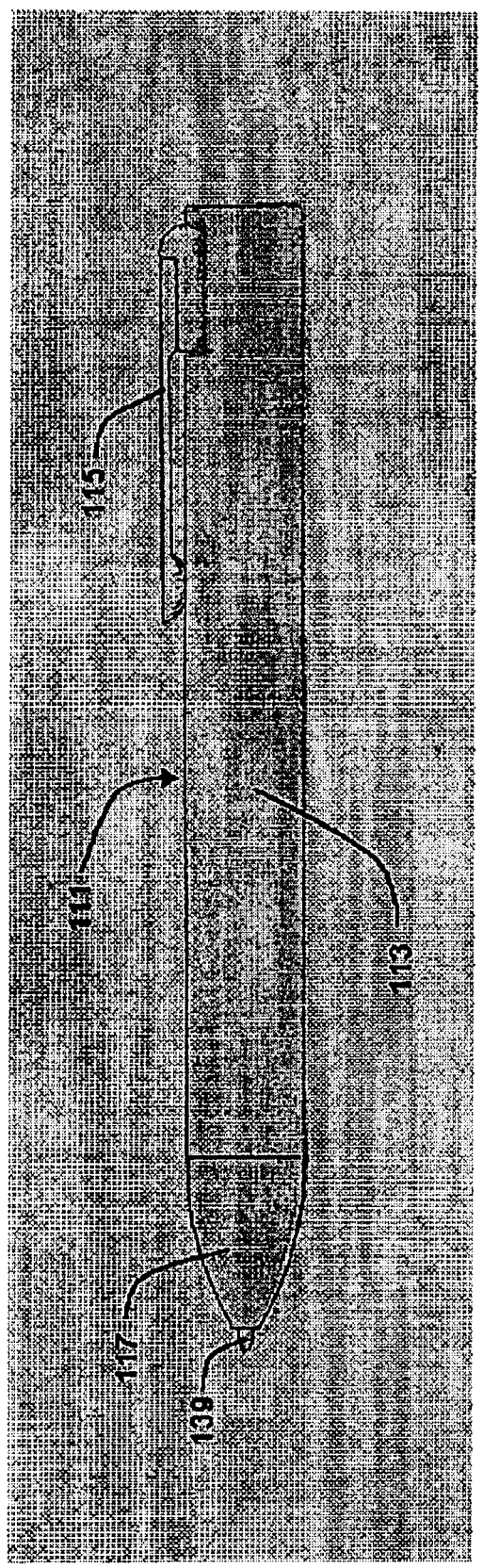
FIG. 8 is a diagram of the alternate twist-actuated pen device for the invention.

FIG. 8 demonstrates a twist actuated pen device 111 which can be substituted for the fixed nib pen device 11 in the pen-caliper system 10 disclosed earlier. As shown, the twist actuated pen in configured for writing with the pen nib 139 is exposed. By twisting the pen tip 117, the pen nib 139 can be retracted into the pen barrel 113 of the pen device 111. The pen barrel 113 is hollow and of such internal design so as the snuggly receive the caliper device 20 for safekeeping and storage. With the caliper device 20 removed from its storage location in the hollow barrel 113 of the pen device 111, the caliper arms 22 and 22' and their respective sharp endpoints 21 and 21' are exposed.

Figure 9:
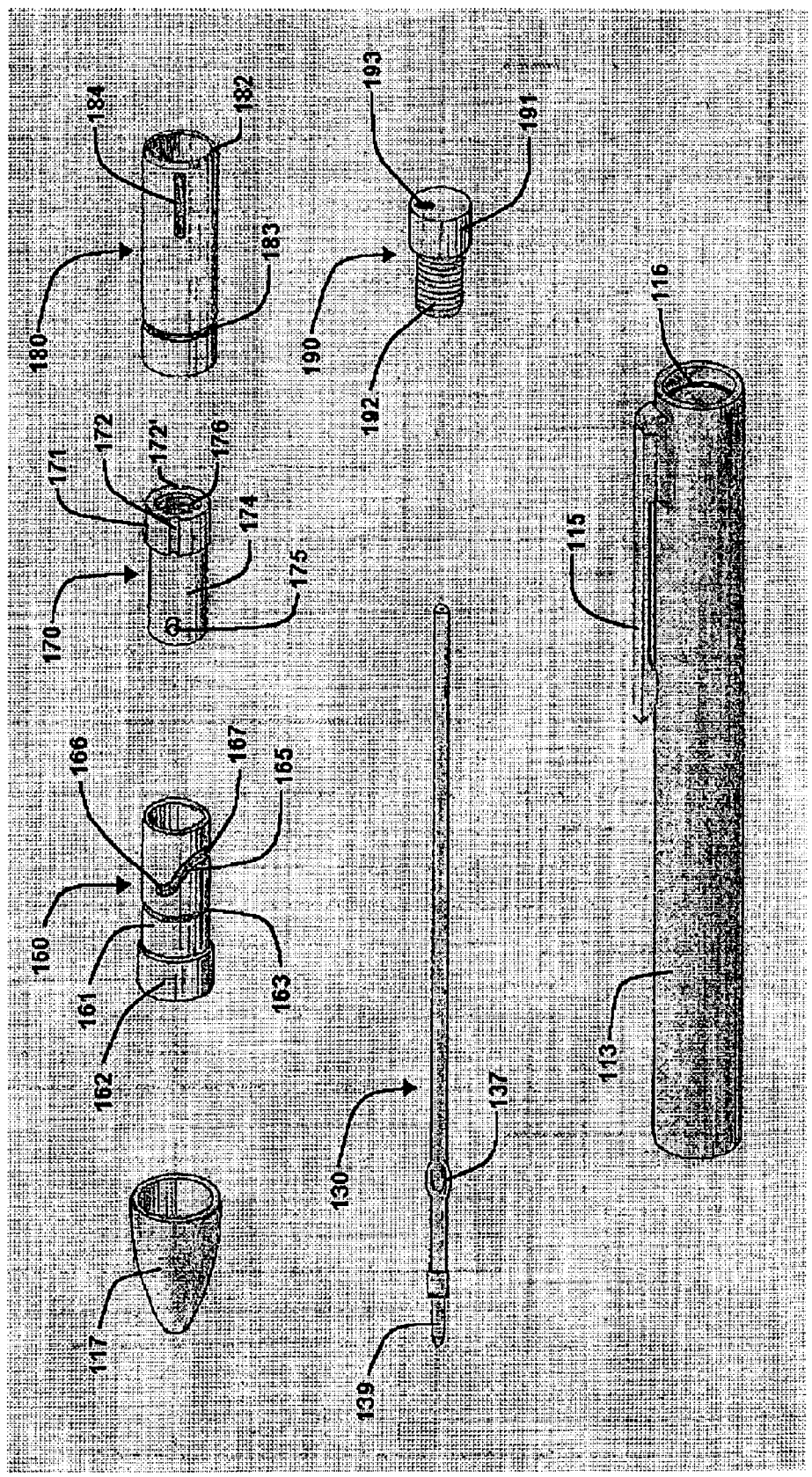
FIG. 9 is an exploded view of the alternate twist-actuated pen device.

FIG. 9 is an exploded view of the twist actuated pen device 111 composed of a pen tip 117, driving casing tube 160, driving axial cylinder 170, external casing tube 180, pen refill 130, pen refill gripper 190, and pen barrel 113.

The pen tip 117 is an appropriately tapered hollow tube of such internal design so as to freely allow the passage of the pen refill 130 while also allowing the pen tip 117 to be fixedly attached to the for portion 162 of the driving casing tube 160 when assembled.

The driving casing tube 160 is a hollow stepped tube composed of a relatively small diameter aft portion 161 and a relatively large diameter fore portion 162. The aft portion 161 of the driving casing tube 160 is of such outer diameter so as to fit within the inner diameter of the external casing tube 180 and rotate and slide freely unless otherwise constrained. The fore portion 162 of the driving casing tube 160 is of such outer diameter so as to fit tightly in the inner diameter of the pen tip 117. A concave ring 163 is provided in the middle section of the relatively small diameter aft portion 161 and the dimensions of this concave ring 163 are matched to the internal ridge formed by the depressed ring 183 of the external casing tube 180. A sinuously curved slot 165 surrounds one half of the aft portion 161 of the driving casing tube at a suitable slanting angle, thus forming a fore most terminal portion 166 and an aft most terminal portion 167 at which the width of the slot can be enlarged.

The driving axial cylinder 170 is a hollow stepped tube with a relatively large diameter head portion 171 and a relatively small diameter body portion 174. The head portion 171 of the driving axial cylinder 170 is of such outer diameter so as to fit within the inner diameter of the external casing tube 180 and rotate and slide freely unless otherwise constrained. Extending along either side of the periphery of the head portion 171 are two longitudinal notches 172 and 172'. When the driving axial cylinder 170 is encased in the external casing tube 180 the two longitudinal notches 172 and 172' are engaged by the corresponding internal ridges formed by the longitudinal depressions 184 and 184' (not shown) in the external casing tube 180 such that the external casing tube 180 and the driving axial cylinder 170 are fixed against relative rotatable movement yet are free to axial movement. Axial movement of the driving axial cylinder 170 is limited by the aft end taper 182 of the external casing tube 180 and the aft portion 161 of the axially fixed driving casing tube 160. The head portion of the driving axial cylinder 170 is also provided with internal threads 176 of such dimension so as to receive the external threads of the fore portion 192 of the pen refill gripper 190. The body 174 of the driving axial cylinder 170 is of such outer diameter so as to fit within the inner diameter of the driving casing tube 160 and rotate and slide freely unless otherwise constrained. The body 174 of the driving axial cylinder 170 is provided with a radially outwardly directed stud 175 which is received by the sinuously curved slot 165 in the driving casing tube 160 when assembled.

The external casing tube 180 is provided with two parallel longitudinally extending depressions 184 and 184' (not shown) on either side of the outer periphery of its aft portion which form corresponding ridges on the inner surface of the external casing tube (not shown), and a depressed ring 183 around the external casing tube 180 in suitable position along the fore portion which forms a ridge on the internal surface of the external casing tube 180. When the driving casing tube 160 is encased in the external casing tube 180, the internal ridge corresponding to the suitably positioned depressed ring 183 of the external casing tube is engaged by the corresponding concave ring 163 in the driving casing tube such that the external casing tube 180 and the driving casing tube 160 are fixed against relative axial movement yet to be relatively rotatable. When the driving axial cylinder 170 is encased in the external casing tube 180 the two longitudinal notches 172 and 172' are engaged by the corresponding longitudinal depressions 184 and 184' (not shown) in the external casing tube 180 such that the external casing tube 180 and the driving axial cylinder 170 are fixed against relative rotatable movement yet are free to axial movement.

The pen refill gripper 190 has a fore portion 192 provided with external threads, and a larger diameter aft portion 191 and is provided with a sinuous tunnel 193 that passes through the length of the pen refill gripper 190 starting near the center of the for portion 192 of the pen refill gripper 190 and finishing off center near the aft portion 191 of the pen refill gripper. The shape and internal dimension of the tunnel 193 is such that when the pen refill 130 is placed within the tunnel 193, the nib 139 of the pen refill 130 aligns with the center of the pen refill gripper 190, the shaft of the pen refill 130 is diverted off center, and relative motion of the pen refill 130 and the pen refill gripper 190 is limited by the enlargement 137 in the shaft of the pen refill 130. Diversion of the shaft of the pen refill 130 off center ensures that the pen refill 130 will not interfere with the caliper arms 18 and 18' when the twist actuated pen device 111 is assembled and the caliper device 20 is placed in its storage position within the hollow aft barrel 113. The external threads of the fore portion 192 of the pen refill gripper 190 are matched to the internal threads 176 of the driving axial cylinder 170.

Figure 10:
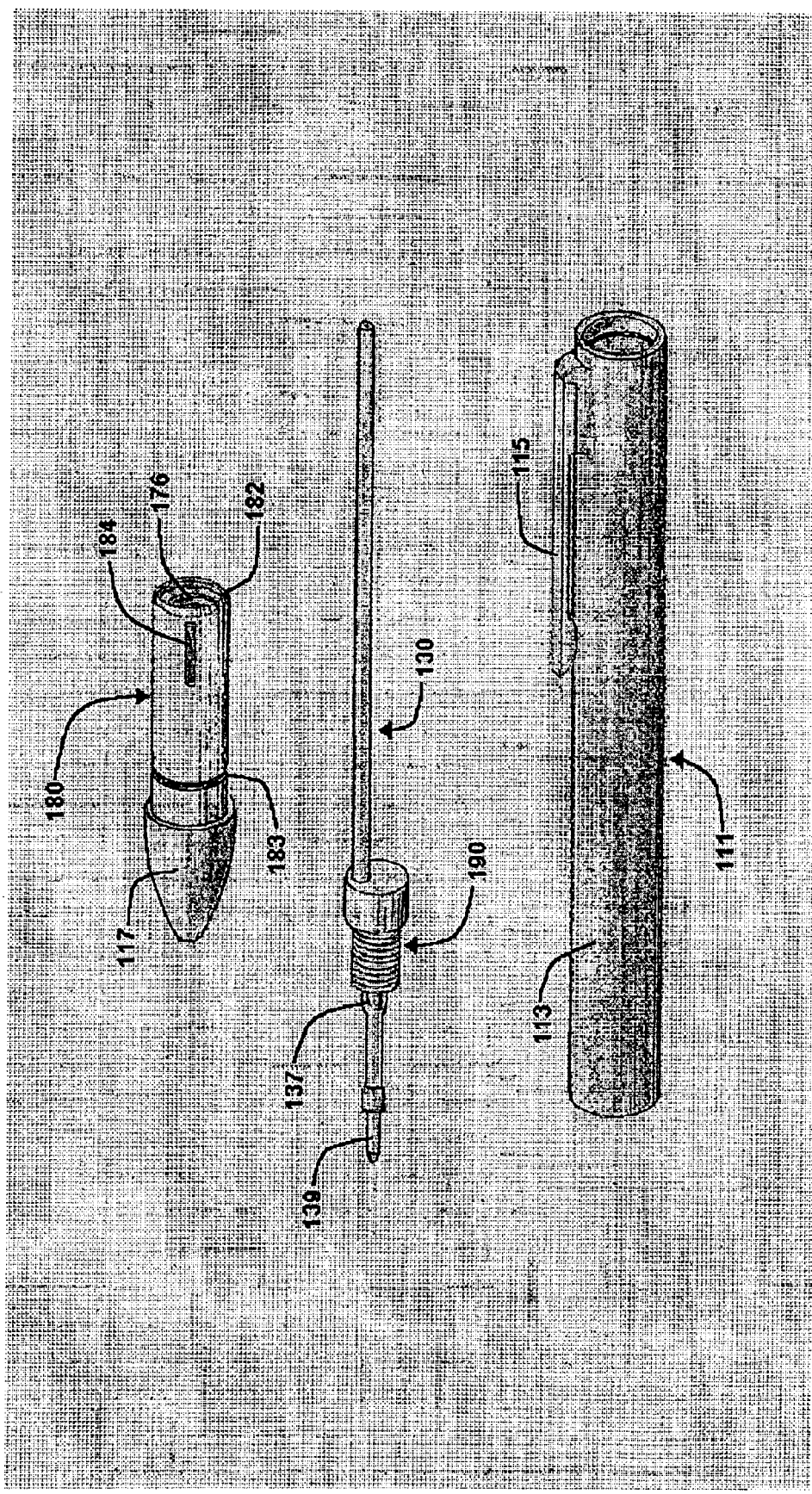
FIG. 10 is a partially assembled view of the alternate twist-actuated pen device.

FIG. 10 demonstrates the partially assembled twist actuated pen device 111. The pen tip 117 is fixably attached to the fore portion 162 of the driving casing tube. The body 174 of the driving axial cylinder 170 is placed within the driving casing tube 160 such that the projection 175 on the body 174 of the driving axial cylinder 170 is engaged by the slot 165 of the driving casing tube 160. The assemblage of the driving axial cylinder 170 and the driving casing tube 160 is then placed into the external casing tube 180 and coupled thereto by engagement of the concave ring 163 and the matching ridge on the internal surface of the external casing tube 180 formed by the depressed ring 183 in the external casing tube 180 such that the driving casing tube 160 is rotatable relative to the external casing tube 180 but held against axial movement. The notches 172 and 172' on the head 171 of the driving axial cylinder 170 align with matching ridges on the inner surface of the external casing tube 180 that are formed by the corresponding longitudinal depressions 184 and 184' (not shown) in the external casing tube 180 such that the driving axial cylinder is free to axial movement relative to external casing tube 180 but is not rotatable relative to external casing tube 180. Thus assembled, rotation of the pen tip 117 relative to the external casing tube 180 causes rotation of the driving casing tube 160 with resultant axial displacement of the driving axial cylinder 170 by the movement of the slot 165 of the driving casing tube 160 past the projection 175 of the driving axial cylinder 170.

The pen refill 130 is aligned with and inserted into the tunnel 193 of the of the pen refill gripper 190 until the enlargement 137 in the pen refill limits further insertion. Thus, the nib 139 of the pen refill 130 aligns with the center of the pen refill gripper 190, the shaft of the pen refill 130 is diverted off center, and further insertion of the pen refill 130 and the pen refill gripper 190 is limited by the enlargement 137 in the shaft of the pen refill 130.

Figure 11:
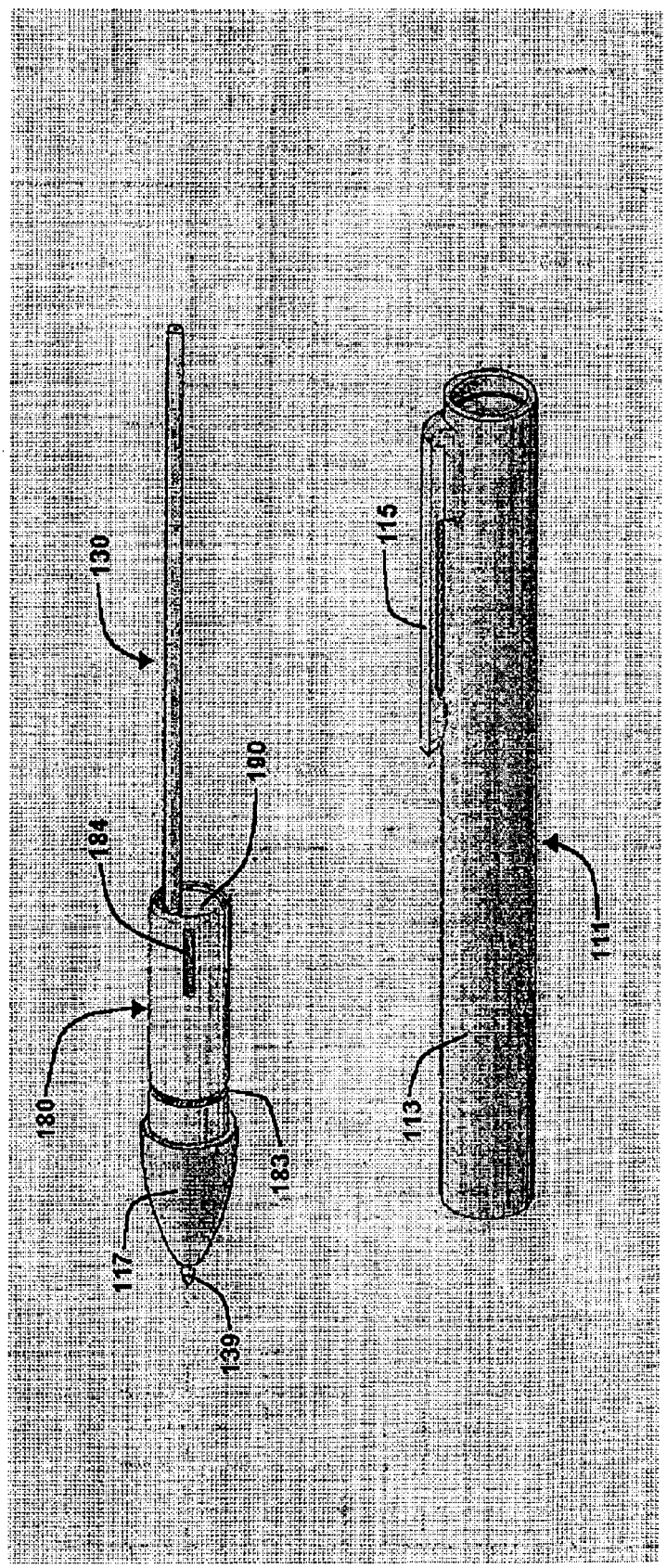
FIG. 11 is a partially assembled view of the alternate twist-actuated pen device with the pen device configured for writing.
Figure 12:
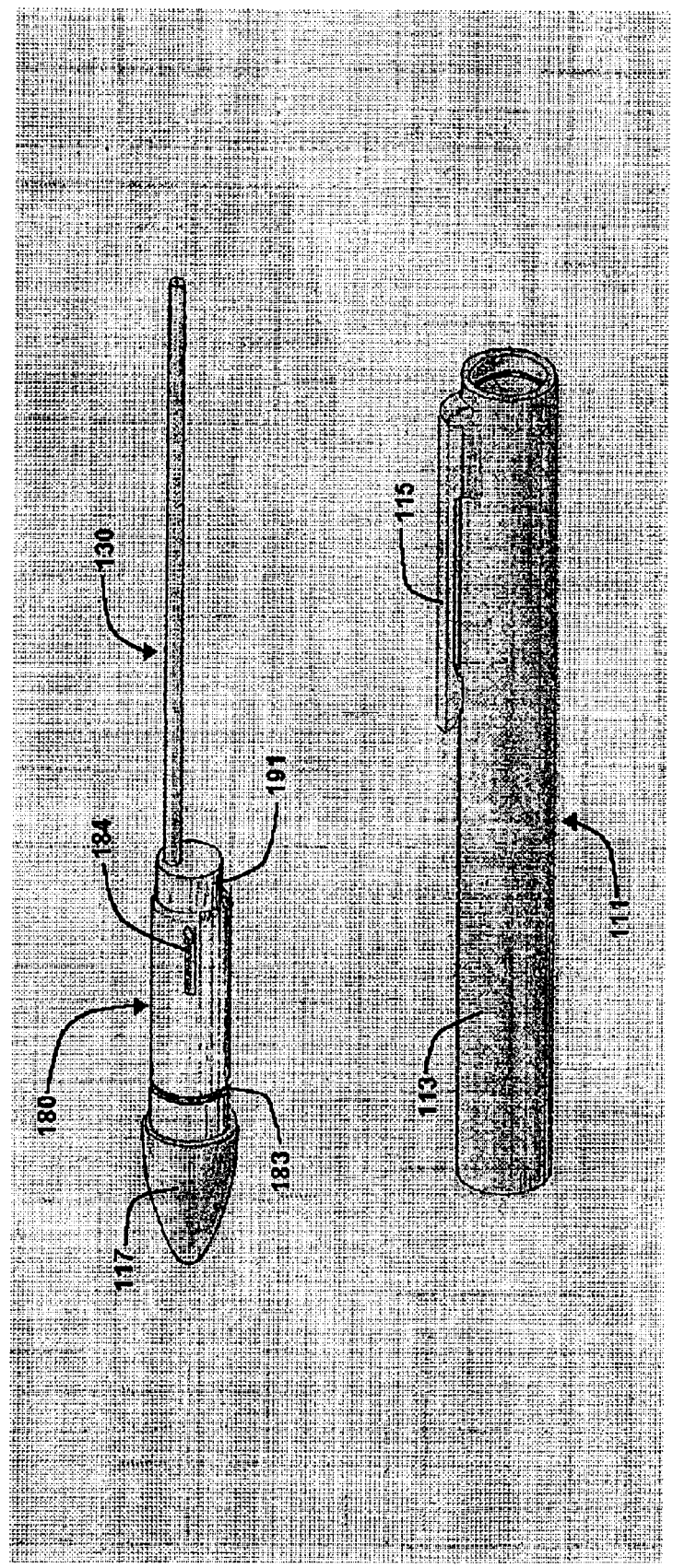
FIG. 12 is a partially assembled view of the alternate twist-actuated pen device with the pen device configured for carrying.

When assembled, rotation of the pen tip 117 is coupled to rotation of the driving casing tube 160 which produces movement of the sinuously curved slot 165 of the driving casing tube 160 past the projection 175 of the driving axial cylinder 170. With the driving axial cylinder 170 fixed against relative rotation by the interaction of the notches 172 and 172' on the head 171 of the driving axial cylinder 170 with the matching ridges on the inner surface of the external casing tube 180 formed by the corresponding longitudinal depressions 184 and 184' (not shown) in the external casing tube 180, the movement of the sinuously curved slot 165 past the projection 175 of the driving axial cylinder 170 causes axial movement of the driving axial cylinder 170 and with it the pen refill 136 between an extended position of FIG. 11 in which the and the retracted position of FIG. 12. When in the extended position shown in FIG. 11, the projection 175 of the driving axial cylinder 170 is located it the fore most terminal portion 166 of the sinuously curved slot 165 with the pen nib 139 of the pen refill 130 held in an extended position convenient for writing. When in the retracted position shown in FIG. 12, the projection 175 of the driving axial cylinder 170 is located in the aft most terminal portion 166 of the sinuously curved slot 165 with the pen nib 139 of the pen refill 130 held in a retracted position convenient for carrying the twist actuated pen device 111.

OTHER POSSIBLE USES AND VARIATIONS

While the invention has been described with reference to several particular embodiments thereof those skilled in the art will be able to make various modifications to the described embodiments of the invention without departing from the true spirit and scope of the invention. It is intended that all combinations of elements and steps that perform substantially the same function to achieve substantially the same result are within the scope of the invention. The first embodiment described herein is a non-retractable pen with a separate caliper stored with in the confines of the hollow pen barrel and with a cap over the pen tip that can be removed and placed over the caliper in order to deploy the pen device as a writing instrument. The second embodiment described herein is a pen with a retractable with a separate caliper stored with in the confines of the hollow pen barrel in which the pen nib can be exposed for writing or retracted for storage by twisting the pen tip relative to the pen barrel. However, it should be understood that the two foregoing ballpoint pen arrangements are just exemplary. Various mechanisms for advancing and retracting the ballpoint cartridge tip could also be used. The arrangement of the caliper device in relationship to the pen refill could also be altered. In a previously non-disclosed embodiment of the invention, the pen refill extended down the center of the pen barrel and the legs of the caliper rested on either side of the pen refill when the caliper was placed in its storage location. The components of the pen device as well as the components of the caliper-device could be composed of any suitable material, including but not limited to aluminum alloys, copper alloys, ferrous alloys, plastics, or ceramics.

I claim:

1. A combined pen and caliper system comprising:
    a pen device having a pen barrel, an elongated pen refill, a pen tip, and a nib,
        wherein the pen barrel is hollow and has a fore end which holds the pen tip and an aft end which is open and houses the elongated pen refill, and
        the pen tip secures the nib through which ink is delivered from the pen to the writing surface,
    a caliper device having a support element and a first and second caliper arm
        wherein each of the first and second caliper arms has a pointed tip end and a pivot end,
        the first and second caliper arms are rotatably joined to the support element at their pivot ends, and
        the caliper device has a closed position wherein the pointed tip ends of the first and second caliper arms are substantially touching,
    wherein the caliper device in the closed position fits snugly and removably with the pointed tip ends of the caliper device facing into the pen barrel in the hollow portion of the aft end of the pen barrel adjacent to the pen refill for temporary removable storage so that the caliper device is completely removable from the aft end of the pen barrel and the writing instrument and the caliper device can be employed in parallel, allowing the user to make written notations with the writing instrument while simultaneously making measurements with the caliper device.

2. The combined pen and caliper system of claim 1 additionally comprising:

a removable pen cap fitting over the pen tip and covering the nib of the pen device, wherein the removable pen cap is storable over the support element of the caliper device.

3. The combined pen and caliper system of claim 1 wherein the elongated pen refill comprises a flexible refill tube having a nib end and a back end, and the system further comprises:

a refill tube grip element having a serpentine tunnel, wherein the flexible refill tube is bent by passing through the serpentine tunnel such that the nib end of the flexible refill tube is aligned substantially along the center of the long axis of the pen device and the back end of the pen refill tube is substantially parallel to the long axis of the pen and substantially flush with the inner wall of the pen barrel, whereby the aft portion of the pen barrel has space for the caliper device to be inserted and stored in the barrel of the pen device without interference from the flexible refill tube.

4. The combined pen and caliper system of claim 3 wherein the pen tip is rotatably attached to the pen barrel, and additionally comprising:

means for extending and retracting the nib by rotating the pen tip relative to the pen barrel.

5. The combined pen and caliper system of claim 1 wherein the pen device has a clip attached to the outer wall of the pen barrel suitable for holding the pen caliber system in a shirt pocket.

6. A combined pen and caliper system comprising:

a pen device, a caliper device having a first and second caliper arm wherein each of the first and second caliper arms has a pointed tip end and a pivot end, the first and second caliper arms are rotatably joined at their pivot ends, and the caliper device has a closed position wherein the pointed tip ends of the two caliper anus are substantially touching, a means for removably storing the caliper assembly in the pen device such that the pointed tip ends of the first and second caliper arm covered by a portion of the pen device, the caliper assembly adapted for insertion into the pen device removably with the pointed tip ends of the caliper device facing into the pen device for temporary removable storage so that the caliper device is completely removable from the pen device and the pen device and the caliper device can be employed in parallel, allowing a user to make written notations with the pen device while simultaneously making measurements with the caliper device.

7. The combined pen and caliper system of claim 6 additionally comprising:

a removable pen cap fitting over the pen tip and covering the nib of the pen device.

8. The combined pen and caliper system of claim 6 additionally comprising:

a flexible refill tube having a nib end and a back end, a means for securing the flexible refill tube in the pen device such that the nib is substantially aligned with the centerline of the pen device and the aft portion of the flexible refill tube is substantially flush with an inner wall of the pen device.

9. The combined pen and caliper system of claim 6 additionally comprising:

a pen tip rotatably attached to the pen device wherein the nib end of the flexible refill tube passes through a hole in a pen tip of the pen device, means for extending and retracting the pen tip by rotating the pen tip relative to the pen device.

10. The combined pen and caliper system of claim 6 wherein the pen device has a clip attached to the outer wall of the pen device adapted for holding the pen caliber system in a shirt pocket.

11. For a caliper device having a first and second caliper arm with each caliper arm having a pointed tip end and a pivot end, and further where the first and second caliper arms are rotatably joined at their pivot ends; a method for storing the caliper assembly in a pen device having a hollow barrel open at one end comprising the steps of:

closing the caliper device so the pointed tip ends of the first and second caliper arms are substantially touching, inserting the caliper device into the open end of the hollow barrel of the pen device wherein the pointed tip ends of the first and second caliper arms comprising the caliper device are the enter the hollow barrel of the pen device first, pushing the caliper device into the hollow barrel of the pen device until it is removably secured so that the caliper device is completely removable from the hollow barrel of the pen device and the pen device and the caliper device can be employed in parallel, allowing the user to make written notations with the pen device while simultaneously making measurements with the caliper device, whereby the pointed ends of the caliper arms are sheathed within the hollow barrel of the pen device.

* * * * *